United States Patent [19]
Hellinger

[11] 3,931,920
[45] Jan. 13, 1976

[54] STRIP-GUIDING STRUCTURE FOR RECORDING OR REPRODUCING APPARATUS

[75] Inventor: Otto Hellinger, Vienna, Austria

[73] Assignees: Karl Vockenhuber; Raimund Hauser, both of Vienna, Austria

[22] Filed: Mar. 21, 1974

[21] Appl. No.: 453,298

[30] Foreign Application Priority Data
Apr. 6, 1973    Austria .................... 3023/73

[52] U.S. Cl. ............... 226/91; 226/110; 242/195; 352/158
[51] Int. Cl.² ......................... G03B 1/56
[58] Field of Search .......... 226/89, 90, 91, 92, 109, 226/110; 242/47.03, 195; 352/157, 158, 124

[56] References Cited
UNITED STATES PATENTS
3,722,988   3/1973   Neudecker .................... 352/158 X FOREIGN PATENTS OR APPLICATIONS
893,402   4/1962   United Kingdom ............... 226/110

Primary Examiner—Richard A. Schacher
Attorney, Agent, or Firm—Ernest G. Montague; Karl F. Ross; Herbert Dubno

[57] ABSTRACT

An apparatus for recording information on a flexible strip or reproducing the information so recorded includes a guide structure for directing a leading end of an oncoming strip, of initially indeterminate curvature, to a self-threading area associated with a take-up reel regardless of strip curvature. The guide structure has an outlet with two or three channels, branching from its inlet, separated by one or two generally wedge-shaped deflectors pointing toward the inlet, the channels being defined by guide rollers establishing points of intersection thereof downstream of the deflector or deflectors.

4 Claims, 6 Drawing Figures

STRIP-GUIDING STRUCTURE FOR RECORDING OR REPRODUCING APPARATUS

BACKGROUND OF THE INVENTION

The invention relates to a recording or reproducing apparatus for strip-like information carriers, particularly to a projector for substandard format film, which is to be guided to the effective range of a threading device for winding up the leading end of the strip on a take-up reel during insertion into the apparatus.

If coated strips, particularly films, are guided to such a threading device for engagement with the take-up reel, the problem arises that the effective range of the threading device has relatively narrow limits, on the one hand, whereas, on the other hand, a coated strip often has a tendency to bend longitudinally. This tendency is not equal with different strips, but differs between very small radii towards one side to small radii towards the other side. The strip may also tend to remain straight Thus, it could not be predicted whether the strips used in the apparatus will have any curvature and if so, of what type. The curvature, however, frequently causes the strip to be led outside the effective range of the threading device by the guiding means, so that the threading operation fails. If all strips had the same predetermined curvature, its effect could be compensated by a suitably formed guiding means. Since this is not the case, however, no way was found up until now to ensure the threading and proper engagement of the strip.

OBJECT OF THE INVENTION

The object of may present invention is to provide, in a strip-handling apparatus, a passive structure adapted to guide the leading end of a flexible strip toward a predetermined region of engagement past an intervening gap, such as the space separating a film guide from a self-threading device associated with a take-up reel in motion-picture equipment.

SUMMARY OF THE INVENTION

I realize this object, in accordance with my invention, by the provision of a guide structure having an inlet for an oncoming strip and an outlet forming a plurality of differently oriented paths, this structure containing directional discriminating means for delivering the leading end of the strip to one or the other path depending upon the direction taken by the strip — according to its curvature — inside the structure.

The discriminating means, inserted between two or three internal channels branching out from the inlet of the structure, may comprise a generally wedge-shaped deflector pointing toward the inlet, or a pair of such deflectors positioned side by side. Guide element such as rollers flank the channels downstream of the deflector or deflectors, these elements preferably including two outer rollers and an inner roller; with the axis of the inner roller lying upstream of a common axial plane of the outer rollers, the paths defined by these rollers intersect at a downstream point or points.

BRIEF DESCRIPTION OF THE DRAWING

The above and other features of my invention will now be described in detail with reference to the accompanying drawing in which.

Figure 1:
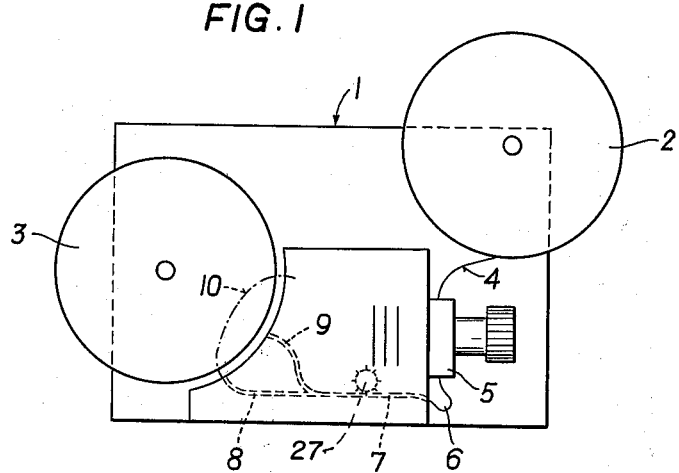
FIG. 1 is a somewhat diagrammatic elevational view of a motion-picture projector provided with a film-guiding structure according to my invention.

A projector 1 has a supply reel 2 and a take-up reel 3. Between these two reels 2 and 3 there is a path for moving a film 4 through a film gate 5 via a loop 6 to a guide 7 with the aid of feed means indicated diagrammatically at 27. The guide 7 is only shown schematically by a dotted line and has two channels 8 and 9 on its left end (see FIG. 1). The take-up reel 3 has a self-threading device not shown which may be formed in any manner known per se. Such self-threading devices are well-known in the art and do not form part of my invention. It is therefore not necessary to describe such devices in detail here. In this connection it is only essential that the film 4 be brought into the effective range of the self-threading device during threading operation to ensure engagement of the leading end of the film, the effective range being broader or narrower according to the construction used. Threading, however, is often inhibited by an undesired tendency of the film to bend. If the film 4 should tend to bend in a direction corresponding to its curvature during take-up onto the supply reel 2 and if such a film were guided through channel 8, it would leave the channel as indicated by the dash-dotted line 10 and would certainly not be threaded onto the take-up reel 3, no matter how the self-threading device were actually constructed. On the other hand, it is clear that the same film would be guided against the center of the take-up reel 3 after passing an alternate channel 9 which imparts an inverse curvature to the film. Obviously the principle applies also conversely to films having a tendency to bend in the opposite direction.

From the above considerations it follows that the guide 7 has to be channel placed with its end facing the take-up reel 3 in the path of either channel 8 or 9 that an arrangement has to be provided for guiding a strip to the proper channel if two fixed channels 8,9 are present. In very simple cases, it would of course be possible to leave it up to the user to thread the strip into the proper channel.

Figure 2A:
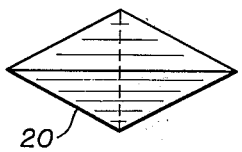
FIGS. 2a, 2b and 2c are front, side and top views, respectively, of a deflector included in the structure of FIG. 2.
Figure 2B:
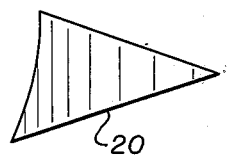
Figure 2C:
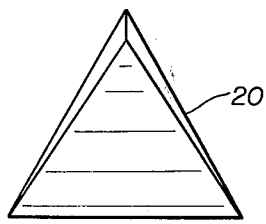
Figure 2:
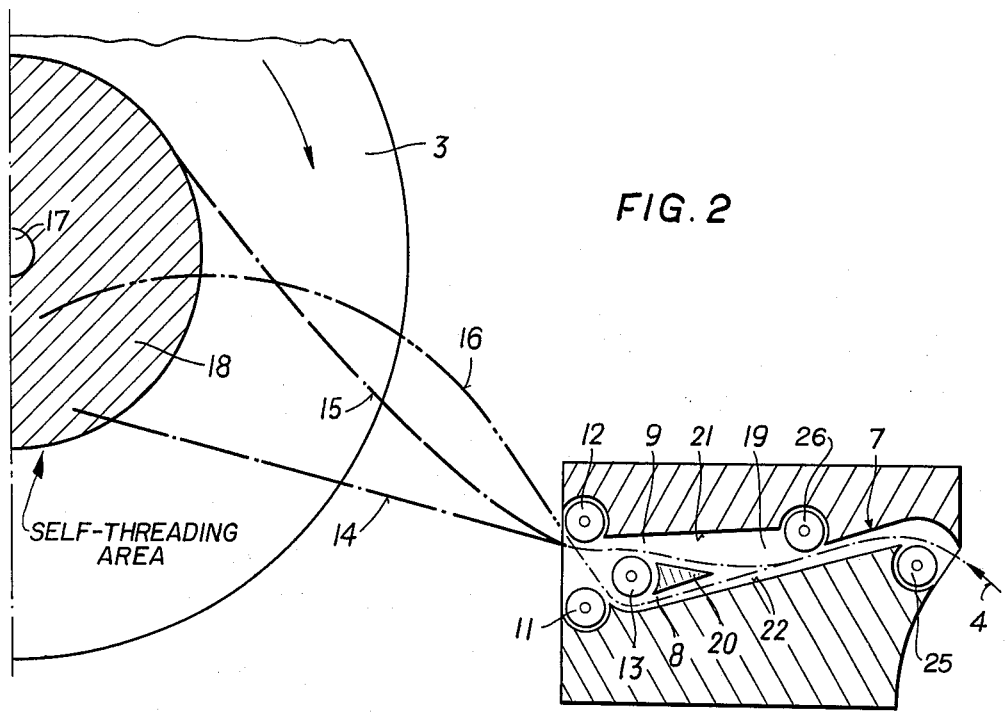
FIG. 2 is an enlarged sectional elevational view of a guide structure as shown in FIG. 1, representing a first embodiment.
Figure 3:
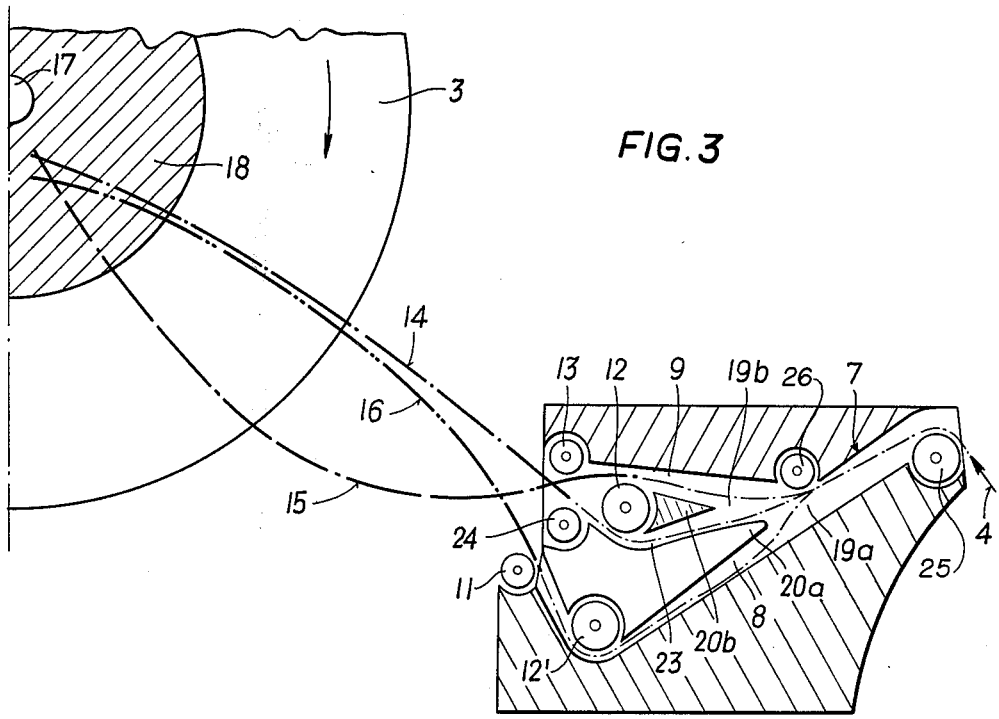
FIG. 3 is a view similar to FIG. 2, showing a second embodiment.

FIGS. 2 and 3 show how this could be realized automatically without movable parts and most economically. In FIG. 2 a portion of the guide structure 7 is shown. At the outlet end of guide 7 facing the take-up reel 3 provide three rollers 11,12 and 13 flanking the channels 8 and 9. The rollers 12 and 13 are arranged in such a manner that they impart a downward curvature to the strip running through channel 9, whereas roller 11 is arranged with respect to roller 12 so that an upward countercurvature is imparted to a film 4 running through channel 8. It will be noted that the axis of inner roller 13 is offset in an upstream direction from the common axial plane of outer roller 11 and 12, with the result that the paths 16 and 14, 15 defined by roller pairs 11, 13 and 12, 13 intersect downstream of the rollers. The paths of films curved in a different manner are shown at 14–16. Thus, the dash-dotted line 14 shows the path of a film without any tendency to bend, the dash-dash-dotted line shows the path of an inwardly curved film and the dash-dot-dotted line 16 shows the path of an outwardly curved film. If it is supposed that the hatched area 18 of reel 3 above the core 17 represents the effective range of the self-threading device within which self-threading and taking up of the leading end of the film is ensured, the lines 14–16 show that this effective range 18 will be reached under all circumstances.

It is, however, necessary that films without tendency to bend or inwardly curved films run through channel 9 whereas outwardly curved films are guided through channel 8. To this end I provide an enlarged passage 19 in guide 7 with a wedge-shaped deflector 20 placed in front of roller 13 with its tip confronting the leading end of the oncoming film 4 being threaded. In this enlarged area 19 the curvature of the film 4 becomes fully effective. The area 19 is bounded on opposite sides of the film plane, on the one hand, by an upper wall 21 and on the other hand by a lower wall 22.

The leading end of a film with inward curvature will therefore be directed against the upper wall 21 after having passed the constricted inlet of the guide structure 7, which is flanked by a pair of rollers 25 and 26, whereas the leading end of an outwardly curved film will be directed against the lower wall 22. The deflector 20 is placed so that its upper surface adjoining the channel 9 is approximately in line with the inlet of the guide structure 7. Therefore films without tendency to bend would also be directed to channel 9. Also, film whose leading ends abut the upper surface 21 are deflected to the upper channel 9 where they receive a light countercurvature by the rollers 12 and 13 so that they run along line 15 rather than along line 10 according to FIG. 1. The opposite applies to films whose leading ends are directed against the lower surface 22. The deflector 20 thus plays the role of an automatic shunt by means of which the direction of curvature of the film is automatically recognized. As may be seen, no movable parts are required to this end, Details of the deflector 20 are shown in FIGS. 2a – 2c in front view, side view and top view, respectively.

In FIG. 3 a further embodiment is shown in which, besides the two outer channels 8 and 9 for curved films, a central channel 23 for films without curvature is also provided in the guide 7. The paths of the differently curved films are again represented by lines 14–16. Since an individual channel 23 is assigned to films without tendency to bend, such films need not be taken into consideration as concerns channel 9, so that a more pronounced counter-curvature can be imparted to the inwardly curved films by the position of rollers 12, 13. This counter-curvature may be clearly seen from line 15, which is now more S-shaped than in FIG. 2. Films without tendency to bend run, to the contrary, between the roller 12 and a roller 24 and have only in some instances a slight outward curvature as a result of their own weight. In the event the projector 1 is positioned so that the reel axes are horizontal, the gravity of the films has to be taken into consideration when constructing the apparatus.

For proper deflecting of the film 4 into the channels 8,9 and 23 two delfectors 20a and 20b are provided in the embodiment of FIG. 3, both generally triangular in cross section. As can be seen, the deflector 20a is positioned alongside the deflector 20b between channels 8 and 9 in a broadened passage 19a, 19b, the larger deflector 20a lying in front of roller 24 and forming at its lower corner a clearance for a deflecting roller 12'. Channel 23 extends between the two deflectors.

What is claimed is:

1. In motion-picture equipment, in combination:
    a take-up reel provided with film-threading means for engaging the leading end of an oncoming film strip of indeterminate initial curvature;
    a guide structure for directing said film strip regardless of its curvature toward said film-threading means across an intervening gap, said guide structure having an inlet for said film strip and an outlet forming a plurality of differently oriented paths leading to said film-threading means;
    feed means for transporting said film strip through said guide structure across said gap toward said filmthreading means; and
    directional discriminating means in said guide structure between said inlet and said outlet for delivering the leading end of said film strip to one of said paths, depending upon the direction taken by the film strip according to its curvature inside said guide structure.

2. The combination defined in claim 1 wherein said guide structure is internally provided with at least two channels branching out from said inlet and with guide elements downstream of said discriminating means establishing a point of intersection of said channels, said discriminating means comprising at least one generally wedge-shaped deflector inserted between said channels and pointing toward said inlet.

3. The combination defined in claim 2 wherein said guide structure is provided with a set of rollers flanking said channels downstream of said deflector.

4. The combination defined in claim 3 wherein said rollers include two outer rollers and an inner roller, said inner roller having an axis upstream of a common axial plane of said outer rollers whereby the paths defined by said rollers intersect downstream of said rollers.

* * * * *